United States Patent
Gong et al.

(10) Patent No.: US 11,936,263 B2
(45) Date of Patent: Mar. 19, 2024

(54) STATOR ASSEMBLY AND STATOR FOR MOTOR

(71) Applicant: Schaeffler Technologies AG & Co. KG, Herzogenaurach (DE)

(72) Inventors: Yu Gong, Shanghai (CN); Lei Liu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 58 days.

(21) Appl. No.: 17/627,709

(22) PCT Filed: Jul. 17, 2019

(86) PCT No.: PCT/CN2019/096352
§ 371 (c)(1),
(2) Date: Jan. 17, 2022

(87) PCT Pub. No.: WO2021/007804
PCT Pub. Date: Jan. 21, 2021

(65) Prior Publication Data
US 2022/0255388 A1 Aug. 11, 2022

(51) Int. Cl.
*H02K 3/487* (2006.01)
(52) U.S. Cl.
CPC ......... *H02K 3/487* (2013.01); *H02K 2213/03* (2013.01)
(58) Field of Classification Search
CPC ............ H02K 3/487; H02K 3/48; H02K 3/46; H02K 2213/03; H02K 2203/00
USPC ......................................................... 310/214
See application file for complete search history.

(56) References Cited

U.S. PATENT DOCUMENTS

| 5,177,385 A * | 1/1993 | Cooper ..................... H02K 9/00 310/260 |
| 2006/0108890 A1* | 5/2006 | Hauger ................ H02K 23/405 310/214 |
| 2010/0019626 A1* | 1/2010 | Stout ........................ H02K 3/50 310/214 |
| 2013/0229084 A1 | 9/2013 | Allen |
| 2015/0288242 A1 | 10/2015 | Chamberlin et al. |
| 2018/0034338 A1* | 2/2018 | Nagata ..................... B62M 6/40 |

FOREIGN PATENT DOCUMENTS

| CN | 201699497 U | 1/2011 |
| CN | 202363995 U | 8/2012 |
| CN | 203243142 U | 10/2013 |

(Continued)

*Primary Examiner* — Michael Andrews (57) ABSTRACT

A stator assembly and stator for a motor is provided that directly installs in a conductor slot a slot wedge having a width approximately the same as the width of the conductor slot. The slot wedge is limited in three directions, circumferential, radial, and axial, by means of cooperation between a slot wedge pressing ring, a conductor, and a sidewall of the conductor slot, and at the same time, the slot wedge is capable of preventing the conductor from falling out of the conductor slot. In addition, in the stator assembly for a motor disclosed, when the slot wedge is installed, the slot wedge may not only be inserted and installed in the conductor slot along the axial direction, but may also be inserted and installed in the conductor slot along the radial direction, and thus, the installation mode is flexible, which may improve the installation efficiency.

12 Claims, 7 Drawing Sheets

(56) References Cited

FOREIGN PATENT DOCUMENTS

| | | | |
|---|---|---|---|
| CN | 105529845 | A | 4/2016 |
| CN | 107171473 | A | 9/2017 |
| CN | 206542268 | U | 10/2017 |
| EP | 3309933 | A1 | 4/2018 |
| GB | 2282012 | A | 3/1995 |
| GB | 2509738 | A | 7/2014 |

* cited by examiner

STATOR ASSEMBLY AND STATOR FOR MOTOR

CROSS-REFERENCE TO RELATED APPLICATIONS

This application is the U.S. National Phase of PCT Appln. No. PCT/CN2019/096352 filed Jul. 17, 2019, the entire disclosure of which is incorporated by reference herein.

TECHNICAL FIELD

The present disclosure relates to the field of motors, and in particular, to a stator assembly for a motor and a stator comprising the stator assembly for a motor.

BACKGROUND

At present, in the field of motors for new energy vehicles, there are increasingly higher requirements for performances such as low harmonic components, low noise and high efficiency. The use of a slot wedge, in particular a magnetic slot wedge, may improve the foregoing performances. However, the slot wedge fixing structure of the stator in a conventional motor has an impact on the foregoing performances.

Figure 1A:
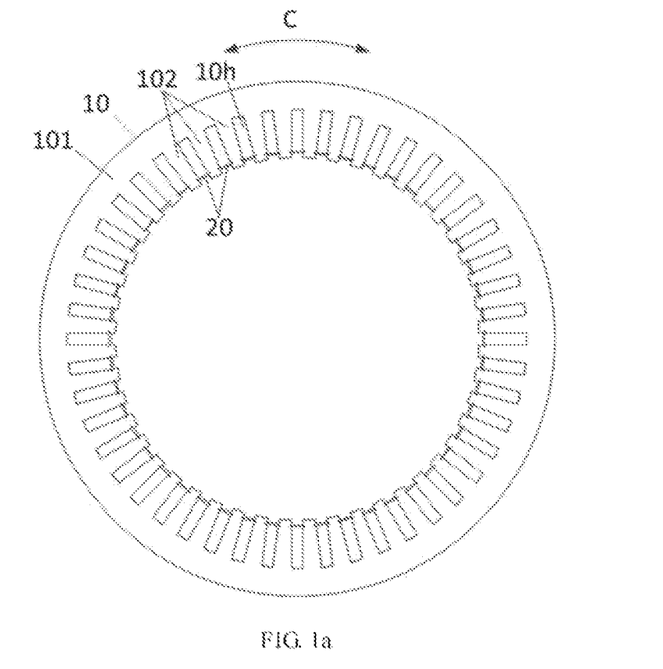
FIG. 1a is a schematic structural diagram showing a stator assembly for a motor.
Figure 1B:
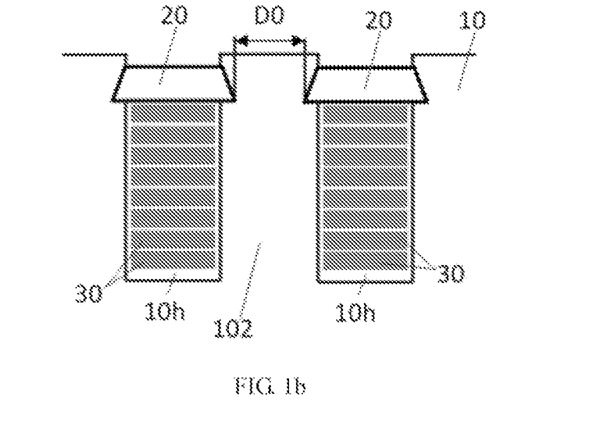

FIG. 1a is a schematic structural diagram showing a stator assembly for a motor, and FIG. 1b shows a slot wedge fixing structure of the stator assembly in FIG. 1a. Specifically, as shown in FIG. 1a, the stator assembly for a motor comprises an iron core 10 and conductors 30 and slot wedges 20 that are installed to the iron core 10. The iron core 10 comprises a cylindrical body portion of the iron core 101 and a plurality of tooth portions of the iron core 102 protruding from the body portion of the iron core 101 toward an inner radial side and uniformly distributed in a circumferential direction C. A conductor slot 10h is formed between every two tooth portions of the iron core 102 adjacent in the circumferential direction C. As shown in FIG. 1b, a slot wedge 20 and a plurality of conductors 30 are installed in each conductor slot 10h, and the slot wedge 20 is located at inner radial sides of the conductors 30, thereby preventing the conductors 30 from falling out of the conductor slot 10h.

A slot wedge fixing structure of the foregoing stator assembly for a motor comprises a dovetail slot extending along an axial direction and formed on circumferential sidewalls of two adjacent tooth portions of the iron core 102 facing each other, and the slot wedge 20 has a shape corresponding to that of the dovetail slot, such that the slot wedge 20 is capable of being inserted into the dovetail slot along the axial direction to be fixed between every two adjacent tooth portions of the iron core 102. As such, on the one hand, the dovetail slot will make the width of each tooth portion of the iron core 102 equal to an actual width DO of the tooth portion of the iron core shown in FIG. 1b, which actually reduces the width of the tooth portion of the iron core 102, thereby increasing magnetic saturation of the tooth portion of the iron core 102 and lowering the performance of the motor; on the other hand, the slot wedge 20 has to be inserted into the conductor slot 10h (that is, inserted into the dovetail slot) along the axial direction in the process of being installed between every two adjacent tooth portions of the iron core 102, making the installation process complicated and inefficient.

SUMMARY

The present disclosure has been made in view of the deficiencies of the prior art as described above. An object of the present disclosure is to provide a stator assembly for a motor with a slot wedge fixing structure that will not produce any adverse effect on the performance of a stator. Another object of the present disclosure is to provide a stator comprising the foregoing stator assembly for a motor.

To achieve the above objects, the following technical schemes are adopted.

The present disclosure provides a stator assembly for a motor, comprising an iron core comprising a cylindrical body portion of the iron core and a plurality of tooth portions of the iron core protruding from the body portion of the iron core toward an inner radial side and arranged along a circumferential direction, a conductor slot that extends along a radial direction being formed between every two tooth portions of the iron core adjacent in the circumferential direction; conductors, a plurality of the conductors being accommodated and installed in each of the conductor slots, and being arranged along the radial direction; slot wedges accommodated and installed in each of the conductor slots, enabling the slot wedges to be located on the inner radial sides of the plurality of conductors in each of the conductor slots; and slot wedge pressing rings fixedly installed on the tooth portions of the iron core on the inner radial side, and interfering with a part of each of the slot wedges from the inner radial side in the radial direction, the conductors and the slot wedge pressing rings thus limiting the slot wedges in the radial direction.

Preferably, two axial ends of the tooth portions of the iron core are each formed with a stepped structure that is concave toward an outer radial side, and the slot wedges are each formed with a notch corresponding to the stepped structure, and each of the stepped structures and the corresponding notch are provided with one slot wedge pressing ring, allowing the two slot wedge pressing rings to limit the slot wedges in an axial direction.

More preferably, the slot wedge pressing rings are fixedly installed on the tooth portions of the iron core in an interference fit.

More preferably, the iron core comprises a plurality of stator laminate sheets and two stator end pressing plates laminated together in the axial direction while being aligned with each other, the two stator end pressing plates are located at two ends of the iron core, and the slot wedge pressing rings are fixedly installed on the stator end pressing plates by pressing against the stator end pressing plates from the inner radial side.

More preferably, each of the stator end pressing plates comprises an annular end pressing plate body and a plurality of end pressing plate teeth protruding from the end pressing plate body toward the inner radial side and arranged along the circumferential direction, each of the stator laminate sheets comprises an annular laminate sheet body and a plurality of laminate sheet teeth protruding from the laminate sheet body toward the inner radial side and arranged along the circumferential direction, the body portion of the iron core is formed by laminating the end pressing plate body and the laminate sheet body together in the axial direction, and the tooth portions of the iron core are formed by laminating the end pressing plate teeth and the laminate sheet teeth together in the axial direction.

More preferably, an inner radial end of each of the end pressing plate teeth is closer to the outer radial side than the inner radial end of the corresponding laminate sheet tooth, such that the end pressing plate teeth and the laminate sheet teeth form stepped structures of the tooth portions of the iron core for the installation of the slot wedge pressing rings.

More preferably, when an inner diameter of the stator end pressing plate is D1 and an inner diameter of the stator laminate sheet is D2, and an outer diameter of the slot wedge pressing ring is d1 and an inner diameter of the slot wedge pressing ring is d2, the following are satisfied: h=(D1-D2)/2, d1=D1, and d2=D2.

More preferably, a radial inner circumferential face of the slot wedge pressing ring is roughly flush with an inner radial end face of the laminate sheet teeth; and/or an axial thickness of the slot wedge pressing ring is roughly equal to that of the stator end pressing plate.

The present disclosure further provides a stator, comprising at least one stator assembly for a motor according to any one of the foregoing technical schemes.

More preferably, the stator comprises a plurality of stator assemblies for a motor, and the plurality of stator assemblies for a motor are connected in series to each other in the axial direction in a coaxial manner.

By the adoption of the foregoing technical schemes, the present disclosure provides a novel stator assembly for a motor and a stator comprising the stator assembly for a motor. The stator assembly omits a dovetail slot formed at the tooth portion of an iron core in the prior art, but directly installs in a conductor slot a slot wedge having a width approximately the same as the width of the conductor slot, the slot wedge is limited in three directions, circumferential, radial, and axial, by means of cooperation between a slot wedge pressing ring, a conductor, and a sidewall of the conductor slot, and at the same time, the slot wedge is capable of preventing the conductor from falling out of the conductor slot. As such, compared to the stator assembly for a motor according to the prior art, the described slot wedge fixing structure will not reduce the width of the tooth portion of the iron core, and thus the magnetic flux of the tooth portion of the iron core does not easily reach oversaturation, thereby preventing the slot wedge fixing structure from producing an adverse effect on the performance of the stator. In addition, in the stator assembly for a motor according to the present disclosure, when the slot wedge is installed, the slot wedge may not only be inserted and installed in the conductor slot along the axial direction, but may also be inserted and installed in the conductor slot along the radial direction, and thus, the installation mode is flexible, which may improve the installation efficiency.

BRIEF DESCRIPTION OF THE DRAWINGS

FIG. 1b is a partially enlarged schematic diagram showing the stator assembly for a motor in FIG. 1a.

FIG. 2b is a partial structural diagram showing the stator assembly for a motor in FIG. 2a; and FIG. 2c is an enlarged view showing a partial structure of the stator assembly for a motor in FIG. 2a.

FIG. 3a is a schematic diagram showing a stator end pressing plate of the stator assembly for a motor in FIG. 2a; FIG. 3b is a schematic diagram showing a stator laminate sheet of the stator assembly for a motor in FIG. 2a; and FIG. 3c is a schematic diagram showing a slot wedge pressing ring of the stator assembly for a motor in FIG. 2a.

DETAILED DESCRIPTION

Exemplary implementations of the present disclosure will be described below with reference to the drawings. It should be noted that, unless indicated otherwise, "axial direction", "radial direction" and "circumferential direction" described herein refer to an axial direction, a radial direction and a circumferential direction of a stator assembly (iron core) for a motor, respectively.

Figure 2A:
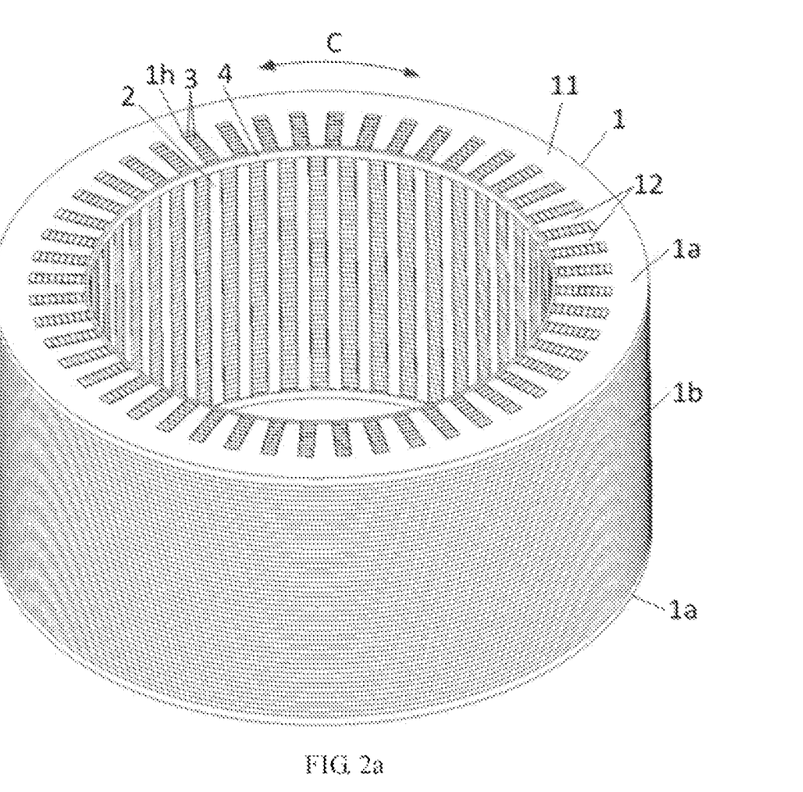
FIG. 2a is a schematic structural diagram showing a stator assembly for a motor according to the present disclosure.
Figure 2B:
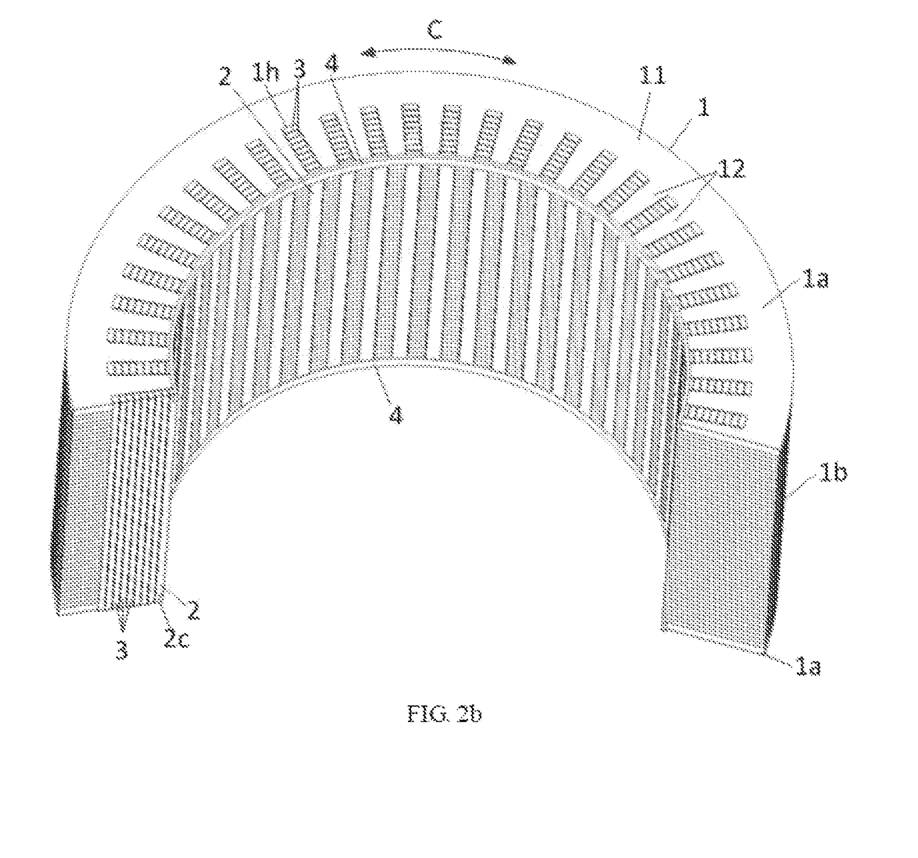
Figure 2C:
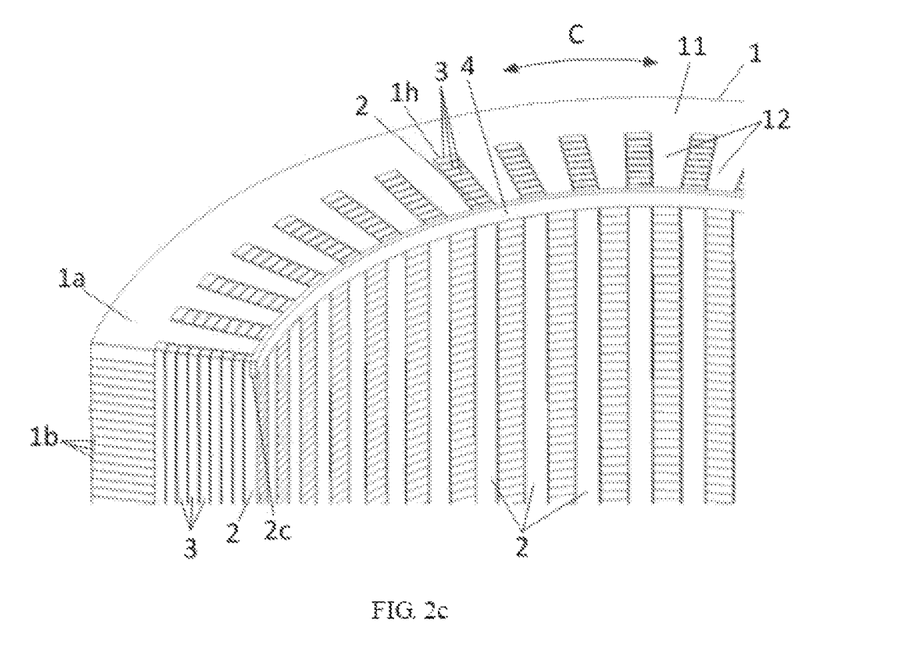

As shown in FIG. 2a to FIG. 2c, the stator assembly for a motor according to the present disclosure comprises an iron core 1, a plurality of slot wedges 2, a plurality of conductors 3, and two slot wedge pressing rings 4, all of which are assembled together.

Specifically, in this implementation, the iron core 1 comprises a cylindrical body portion of the iron core 11 and a plurality of tooth portions of the iron core 12 protruding from the body portion of the iron core 11 toward an inner radial side, and the tooth portions of the iron core 12 have the same shape and dimension. In a circumferential direction C, one conductor slot 1h extending in a radial direction is formed between every two adjacent tooth portions of the iron core 12. Since the plurality of tooth portions of the iron core 12 are uniformly distributed in the circumferential direction C, the plurality of conductor slots 1h are also uniformly distributed in the circumferential direction C.

Figure 3A:
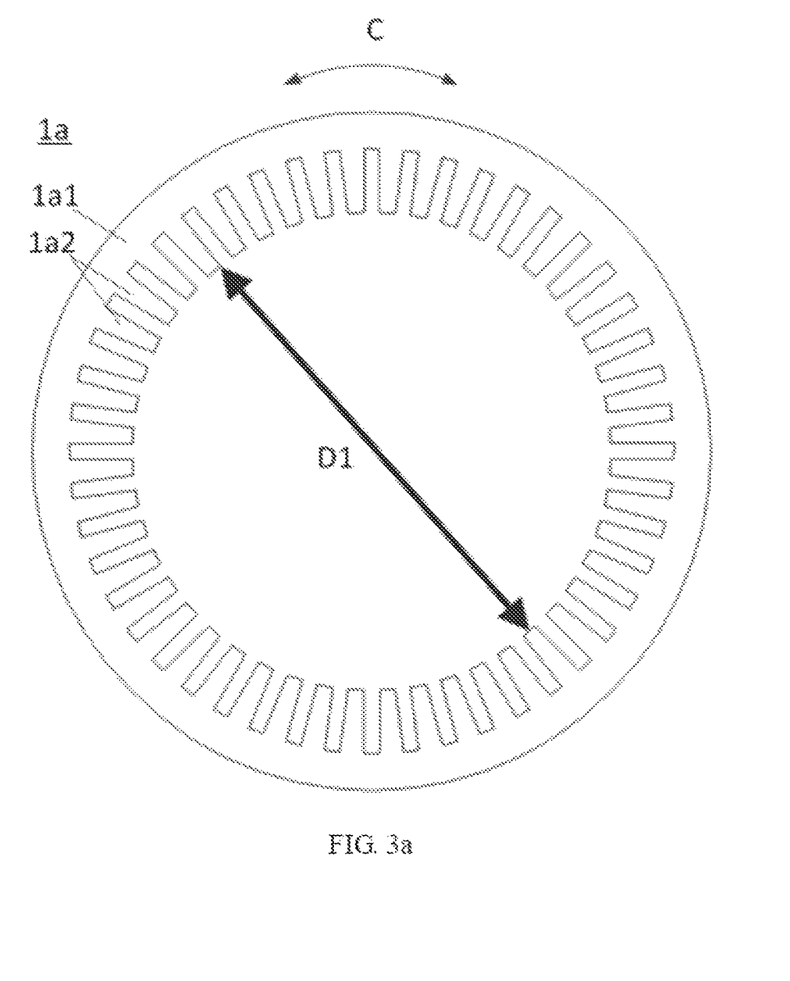
Figure 3B:
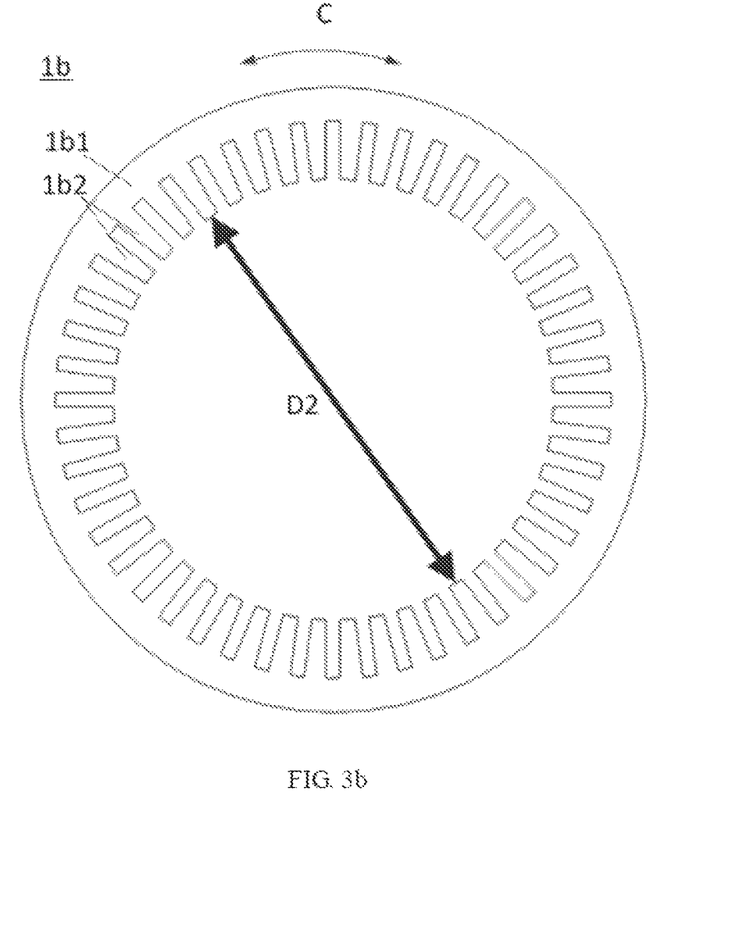

The iron core 1 comprises two stator end pressing plates 1a (as shown in FIG. 3a) and a plurality of stator laminate sheets 1b (as shown in FIG. 3b) laminated together in an axial direction. Viewed from the axial direction, the stator end pressing plates 1a and the stator laminate sheets 1b are roughly aligned with each other. In the axial direction, the plurality of stator laminate sheets 1b are disposed between the two stator end pressing plates 1a, such that the two stator end pressing plates 1a are located at two axial ends of the iron core 1.

As shown in FIG. 3a, the stator end pressing plates 1a are made of metal materials such as silicon steel. Each of the stator end pressing plates 1a comprises an annular end pressing plate body 1a1 and a plurality of end pressing plate teeth 1a2 protruding from the end pressing plate body 1a1 toward the inner radial side, and the plurality of end pressing plate teeth 1a2 have the same shape and dimension and are uniformly arranged along the circumferential direction C. As shown in FIG. 3b, the stator laminate sheets 1b are preferably made of silicon steel. Each of the stator laminate sheets 1b comprises an annular laminate sheet body 1b1 and a plurality of laminate sheet teeth 1b2 protruding from the laminate sheet body 1b1 toward the inner radial side, and the plurality of laminate sheet teeth 1b2 have the same shape and dimension and are uniformly arranged along the circumferential direction C. Further, the end pressing plate body 1a1 and the laminate sheet body 1b1 are identical in both shape and dimension. The number of the end pressing plate teeth 1a2 and the number of the laminate sheet teeth 1b2 are the same; and in terms of shape and dimension, the end pressing plate teeth 1a2 and the laminate sheet teeth 1b2 differ only in radial dimensions.

As such, the end pressing plate body 1a1 and the laminate sheet body 1b1 are laminated and fixed together in the axial direction while being aligned with each other to form the body portion of the iron core 11, and the end pressing plate teeth 1a2 and the laminate sheet teeth 1b2 are laminated and fixed together in the axial direction to form the tooth portions of the iron core 12. When the end pressing plate teeth 1a2 and the laminate sheet teeth 1b2 are laminated together in the axial direction, due to the difference in radial dimensions of the end pressing plate teeth 1a2 and the laminate sheet teeth 1b2, an inner radial end of each of the end pressing plate teeth 1a2 is closer to the outer radial side than an inner radial end of the corresponding laminate sheet tooth 1b2, such that the end pressing plate teeth 1a2 and the laminate sheet teeth 1b2 form stepped structures for the installation of the slot wedge pressing rings 4.

In this implementation, one slot wedge 2 is accommodated and installed in each conductor slot 1h. In each conductor slot 1h, the corresponding slot wedge 2 is located on the inner radial sides of a plurality of conductors 3, such that the slot wedge 2 can limit the corresponding conductors 3 on the inner radial sides. An axial length of each slot wedge 2 is equal to that of the iron core 1, enabling two axial ends of the slot wedge 2 to be aligned with two axial ends of the iron core 1. As shown in FIG. 2b and FIG. 2c, two axial ends of each slot wedge 2 are each formed with a notch 2c corresponding to the foregoing stepped structure of the tooth portion of the iron core 12, and the notch 2c is also used for the installation of the slot wedge pressing ring 4.

In this implementation, a plurality of conductors 3 are accommodated and installed in each conductor slot 1h. In each conductor slot 1h, the plurality of conductors 3 are arranged in the radial direction by abutting against each other. Sidewalls used to form the conductor slot 1h can limit the conductors 3 on the outer radial side and two circumferential sides. An axial length of each conductor 3 is equal to that of the iron core 1, enabling two axial ends of the conductor 3 to be aligned with two axial ends of the iron core 1.

In this implementation, two slot wedge pressing rings 4 are provided, and each of the slot wedge pressing rings 4 is fixedly installed at the stepped structure of the tooth portion of the iron core 12 and the notch 2c of the corresponding slot wedge 2 from the inner radial side, such that the slot wedge pressing rings 4 and the slot wedges 2 structurally interfere in the radial direction and axial direction. As such, sidewalls used to form the conductor slot 1h can limit the slot wedge 2 from two circumferential sides, the conductors 3 can limit the slot wedge 2 on the outer radial side, and the two slot wedge pressing rings 4 can not only limit the slot wedge 2 from the inner radial side, but also limit the slot wedge 2 from two axial sides respectively. Therefore, the slot wedge 2 is limited in the circumferential direction, radial direction, and axial direction.

Preferably, the two slot wedge pressing rings 4 are fixedly installed on the tooth portions of the iron core 12 by pressing against inner radial side faces of the end pressing plate teeth 1a2 of the stator end pressing plate 1a from the inner radial side and in an interference fit.

Figure 3C:
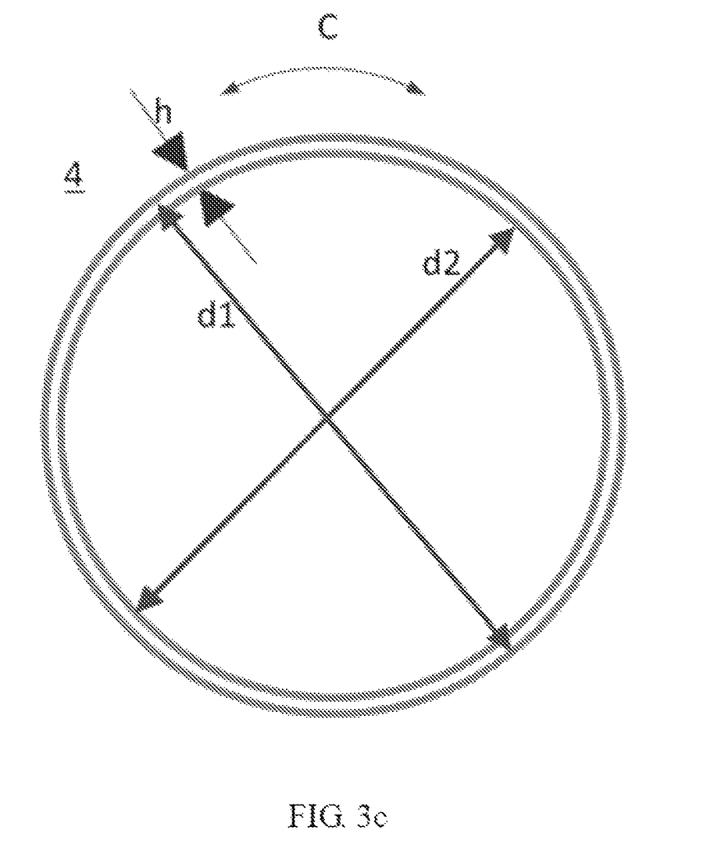

To ensure that the dimension of the slot wedge pressing ring 4 will not affect the operation and assembly of the stator, as shown in FIG. 3a to FIG. 3c, it is assumed that an inner diameter of the stator end pressing plate 1a defined by the inner radial side faces of the end pressing plate teeth 1a2 is D1 and an inner diameter of the stator laminate sheet 1b defined by the inner radial side faces of the laminate sheet teeth 1b2 is D2, an outer diameter of the slot wedge pressing ring 4 is d1, an inner diameter of the slot wedge pressing ring 4 is d2, and a radial thickness of the slot wedge pressing ring 4 is h, then the following will be satisfied: $h=(D1-D2)/2$, $d1=D1$, and $d2=D2$. In the case that the foregoing conditions are satisfied, the interference fit between the slot wedge pressing ring 4 and the tooth portion of the iron core 12 is ensured by using tolerance.

More preferably, $h=(D1-D2)/2$. As such, after the slot wedge pressing ring 4 is fixedly installed at the stepped structure of the tooth portion of the iron core 12 and the notch 2c of the slot wedge 2, a radial inner circumferential face of the slot wedge pressing ring 4 is roughly flush with an inner radial end face of the stator laminate sheet 1b (roughly on the same cylindrical face). In addition, an axial thickness of the slot wedge pressing ring 4 is roughly equal to that of the stator end pressing plate 1a. As such, after the slot wedge pressing ring 4 is fixedly installed at the stepped structure of the tooth portion of the iron core 12 and the notch 2c of the slot wedge 2, an axial end face of the slot wedge pressing ring 4 is roughly flush with that of the stator end pressing plate 1a.

Further, the present disclosure also provides a stator for a motor, the stator comprising at least one stator assembly for a motor with the foregoing structure. When the stator comprises a plurality of stator assemblies for a motor, the plurality of stator assemblies for a motor may be connected in series to each other in the axial direction in a coaxial manner, such that a stator having a predetermined axial length can be obtained.

Certainly, the present disclosure is not limited to the above-mentioned implementations, and those skilled in the art can make various modifications to the above-mentioned implementations of the present disclosure under the teaching of the present disclosure without departing from the scope of the present disclosure. In addition, it should also be noted that:

(i) Although not explicitly described in the foregoing specific implementations, it should be understood that the slot wedge according to the present disclosure may be inserted into the conductor slot along the axial direction or along the radial direction. In this way, the slot wedge installation mode is flexible, which may facilitate installation and improve the installation efficiency.

(ii) Although not explicitly described in the foregoing specific implementations, it should be understood that the width of the slot wedge may be the same as or slightly smaller than that of the conductor slot, such that the slot wedge can be installed in the conductor slot. In addition, the material of the slot wedge is different from that of the conductor. Furthermore, the cross section of the slot wedge is not limited to a wedge shape, but may be in any shape such as a rectangle.

(iii) Although not explicitly described in the foregoing specific implementations, it should be understood that when the stator comprises a plurality of stator assemblies for a motor according to the present disclosure, one slot wedge pressing ring and one stator end pressing plate may be shared between every two adjacent stator assemblies.

(iv) In the present disclosure, the stator end pressing plate may be made of the same material as that of the stator laminate sheet. As such, the stator end pressing plate may be formed by changing radial dimensions of laminate sheet teeth of a plurality of stator laminate sheets and then laminating the plurality of stator laminate sheets together.

LIST OF REFERENCE NUMERALS

10 Iron core
101 Body portion of iron core
102 Tooth portion of iron core
10h Conductor slot
20 Slot wedge
30 Conductor
D0 Actual width of tooth portion of iron core
1 Iron core
11 Body portion of iron core
12 Tooth portion of iron core 1h Conductor slot
1a Stator end pressing plate
1a1 End pressing plate body
1a2 End pressing plate tooth
1b Stator laminate sheet
1b1 Laminate sheet body
1b2 Laminate sheet tooth
2 Slot wedge
2c Notch
3 Conductor
4 Slot wedge pressing ring
d1 Outer diameter of slot wedge pressing ring
d2 Inner diameter of slot wedge pressing ring
D1 Inner diameter of stator end pressing plate
D2 Inner diameter of stator laminate sheet
h Radial thickness of slot wedge pressing ring
C Circumferential direction

The invention claimed is:

1. A stator assembly for a motor, comprising
an iron core comprising a cylindrical body portion and a plurality of tooth portions protruding from the body portion of the iron core toward an inner radial side and arranged along a circumferential direction, a conductor slot that extends along a radial direction being formed between every two tooth portions of the iron core adjacent in the circumferential direction;
a plurality of conductors accommodated and installed in each of the conductor slots, and being arranged along the radial direction;
slot wedges accommodated and installed in each of the conductor slots, wherein the slot wedges are located on the inner radial sides of the plurality of conductors in each of the conductor slots; and
slot wedge pressing rings fixedly installed to the tooth portions of the iron core on the inner radial side, and interfering with a part of each of the slot wedges from the inner radial side in the radial direction, the conductors and the slot wedge pressing rings thus limiting the slot wedges in the radial direction,
wherein:
the iron core comprises a plurality of stator laminate sheets and two stator end pressing plates laminated together in an axial direction while being aligned with each other,
each of the stator end pressing plates comprises an annular end pressing plate body and a plurality of end pressing plate teeth protruding from the end pressing plate body toward the inner radial side and arranged along the circumferential direction,
each of the stator laminate sheets comprises an annular laminate sheet body and a plurality of laminate sheet teeth protruding from the laminate sheet body toward the inner radial side and arranged along the circumferential direction, and
an inner radial end of each of the end pressing plate teeth is closer to an outer radial side than the inner radial end of the corresponding laminate sheet tooth, such that the end pressing plate teeth and the laminate sheet teeth form a stepped structure of the tooth portions of the iron core for installation of the slot wedge pressing rings.

2. The stator assembly for a motor according to claim 1, wherein two axial ends of the tooth portions of the iron core are each formed with the stepped structure that is concave toward an outer radial side, and the slot wedges are each formed with a notch corresponding to the stepped structure, and each of the stepped structures and the corresponding notch are provided with one slot wedge pressing ring, allowing the slot wedge pressing rings to limit the slot wedges in an axial direction.

3. The stator assembly for a motor according to claim 2, wherein the two stator end pressing plates are located at two ends of the iron core, and the slot wedge pressing rings are fixedly installed to the stator end pressing plates by pressing against the stator end pressing plates from the inner radial side.

4. The stator assembly for a motor according to claim 3, wherein
the body portion of the iron core is formed by laminating the end pressing plate body and the laminate sheet body together in the axial direction, and the tooth portions of the iron core are formed by laminating the end pressing plate teeth and the laminate sheet teeth together in the axial direction.

5. The stator assembly for a motor according to claim 1, wherein the slot wedge pressing rings are fixedly installed to the tooth portions of the iron core in an interference fit.

6. The stator assembly for a motor according to claim 1, wherein when an inner diameter of the stator end pressing plate is D1 and an inner diameter of the stator laminate sheets is D2, and an outer diameter of the slot wedge pressing ring is d1 and an inner diameter of the slot wedge pressing ring is d2, and a radial thickness of the slot wedge pressing ring is h, the following are satisfied:

$$h=(D1-D2)/2, d1=D1, \text{ and } d2=D2.$$

7. The stator assembly for a motor according to claim 1, wherein at least one of:
a radial inner circumferential face of the slot wedge pressing ring is roughly flush with an inner radial end face of the laminate sheet teeth; and
an axial thickness of the slot wedge pressing ring is roughly equal to that of the stator end pressing plates.

8. A stator, comprising at least one stator assembly for a motor according to claim 1, wherein the stator comprises a plurality of stator assemblies for the motor, and the plurality of stator assemblies for the motor are connected in series to each other in an axial direction in a coaxial manner.

9. A stator assembly for a motor, comprising:
an iron core including a cylindrical body portion and a plurality of tooth portions protruding from the body portion of the iron core toward an inner radial side and arranged along a circumferential direction, the iron core further comprising:
a plurality of stator laminate sheets each having an annular laminate sheet body and a plurality of laminate sheet teeth protruding from the laminate sheet body toward an inner radial side;
a first stator end pressing plate and a second stator end pressing plate, the plurality of stator laminate sheets being disposed therebetween in an axial direction, wherein the first and the second end pressing plates each have an annular end pressing plate body and a plurality of end pressing plate teeth protruding from the end pressing plate body, wherein the cylindrical body portion of the iron core is formed by laminating the end pressing plate body of the end pressing plates and the laminate sheet body of the stator laminate sheets together in the axial direction, and the tooth portions of the iron core are formed by laminating the end pressing plate teeth and the laminate sheet teeth together in the axial direction;
a plurality of conductor slots extending along a radial direction, wherein each conductor slot is formed between every two tooth portions of the iron core that are adjacent in a circumferential direction;

a plurality of conductors disposed within each of the conductor slots and arranged along the radial direction;

a plurality of slot wedges, wherein one slot wedge of the plurality of slot wedges is disposed in each of the conductor slots, wherein the slot wedges are located on the inner radial side of the iron core; and a first slot wedge pressing ring and a second slot wedge pressing ring fixedly installed to the tooth portions of the iron core on the inner radial side and arranged to secure the conductors and slot wedges within the conductor slots, wherein the first and the second stator end pressing plates have a first inner diameter and the plurality of stator laminate sheets have a second inner diameter less than the first inner diameter such that a first stepped structure is formed on one axial end between the first stator end pressing plate and one of the stator laminate sheets and a second stepped structure is formed on an opposite axial end between the second stator end pressing plate and one of the stator laminate sheets.

10. The stator assembly according to claim 9, wherein the first inner diameter is defined by inner radial side faces of the end pressing plate teeth and the second inner diameter is defined by inner radial side faces of the laminate plate teeth.

11. The stator assembly according to claim 10, wherein the slot wedges are each formed with a notch on each end corresponding to the first and the second stepped structure such that the first and the second end pressing plates are fixed in the corresponding notches and stepped structures.

12. The stator assembly according to claim 9, wherein the first slot pressing ring is fixed in the first stepped structure and the second slot pressing ring is fixed in the second stepped structure via an interference fit.

* * * * *